(12) United States Patent
Glick et al.

(10) Patent No.: US 9,661,004 B1
(45) Date of Patent: *May 23, 2017

(54) SYSTEMS AND METHODS FOR USING REPUTATION INFORMATION TO EVALUATE THE TRUSTWORTHINESS OF FILES OBTAINED VIA TORRENT TRANSACTIONS

(71) Applicant: Symantec Corporation, Mountain View, CA (US)

(72) Inventors: Adam Glick, Culver City, CA (US); Nicholas Graf, Culver City, CA (US); Spencer Smith, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 14/065,394

(22) Filed: Oct. 28, 2013

Related U.S. Application Data

(63) Continuation of application No. 12/880,581, filed on Sep. 13, 2010, now Pat. No. 8,627,463.

(51) Int. Cl.
  *G06F 11/00* (2006.01)
  *H04L 29/06* (2006.01)

(52) U.S. Cl.
  CPC ........ *H04L 63/1408* (2013.01); *H04L 63/145* (2013.01); *H04L 63/1416* (2013.01)

(58) Field of Classification Search
  CPC  H04L 63/1416; H04L 63/1408; H04L 63/145
  USPC .......................... 726/2, 22; 707/622; 709/225
  See application file for complete search history.

(56) References Cited

U.S. PATENT DOCUMENTS

| | | | |
|---|---|---|---|
| 7,269,851 B2 | 9/2007 | Ackroyd | |
| 7,822,631 B1 * | 10/2010 | Vander Mey | ..... G06F 17/30038 705/7.29 |
| 7,831,412 B1 | 11/2010 | Sobel et al. | |
| 8,214,490 B1 * | 7/2012 | Vos et al. | ...................... 709/224 |

(Continued)

OTHER PUBLICATIONS

Wikipedia; "BitTorrent"; http://liveweb.archive.org/web/20100409072349/http://en.wikipedia.org/wiki/BitTorrent, as accessed on Apr. 27, 2010; (Apr. 4, 2010).

about.com; "Visual Guide: The Top 35 Torrent Sites of 2010"; http://netforbeginners.about.com/od/downloadingfiles/tp/torrent_search.html, as accessed on Apr. 27, 2010; (Apr. 2010).

(Continued)

*Primary Examiner* — Saleh Najjar
*Assistant Examiner* — Peiliang Pan
(74) *Attorney, Agent, or Firm* — FisherBroyles LLP

(57) ABSTRACT

A computer-implemented method for using reputation information to evaluate the trustworthiness of files obtained via torrent transactions may include (1) identifying a torrent file that includes metadata for facilitating a torrent transaction for obtaining a target file via a peer-to-peer file-sharing protocol, (2) identifying at least one entity involved in the torrent transaction, (3) obtaining reputation information associated with the entity involved in the torrent transaction, wherein the reputation information identifies a community's opinion on the trustworthiness of the entity, (4) determining, based at least in part on the reputation information associated with the entity involved in the torrent transaction, that the target file represents a potential security risk, and then (5) performing a security action on the target file. Various other methods, systems, and computer-readable media are also disclosed.

17 Claims, 9 Drawing Sheets

(56) References Cited

U.S. PATENT DOCUMENTS

| | | | |
|---|---|---|---|
| 8,336,100 B1* | 12/2012 | Glick et al. ............... | 726/23 |
| 8,490,206 B1* | 7/2013 | Fish ............... | G06F 17/3089 |
| | | | 726/30 |
| 2005/0283831 A1 | 12/2005 | Ryu et al. | |
| 2006/0026123 A1* | 2/2006 | Moore et al. ............... | 707/2 |
| 2006/0116898 A1* | 6/2006 | Peterson ............... | 705/1 |
| 2006/0253579 A1* | 11/2006 | Dixon et al. ............... | 709/225 |
| 2006/0253584 A1 | 11/2006 | Dixon et al. | |
| 2006/0265747 A1* | 11/2006 | Judge ............... | 726/22 |
| 2008/0184366 A1* | 7/2008 | Alperovitch et al. ............... | 726/22 |
| 2009/0007102 A1* | 1/2009 | Dadhia et al. ............... | 718/1 |
| 2009/0282476 A1* | 11/2009 | Nachenberg et al. ............... | 726/22 |
| 2009/0313700 A1* | 12/2009 | Horne ............... | 726/24 |
| 2009/0328209 A1* | 12/2009 | Nachenberg ............... | G06F 21/62 |
| | | | 726/22 |
| 2010/0125911 A1* | 5/2010 | Bhaskaran ............... | G06Q 10/10 |
| | | | 726/23 |
| 2010/0161399 A1* | 6/2010 | Posner et al. ............... | 705/14.13 |
| 2010/0293094 A1* | 11/2010 | Kolkowitz et al. ............... | 705/44 |
| 2012/0030083 A1* | 2/2012 | Newman et al. ............... | 705/35 |

OTHER PUBLICATIONS

Wikipedia; "Comparison of BitTorrent clients"; http://liveweb.archive.org/web/20111203121521/http://en.wikipedia.org/wiki/Comparison_of BitTorrent_clients, as accessed on Apr. 27, 2010; (Apr. 27, 2010).

Theoryorg; "BitTorrentSpecification"; http://liveweb.archive.org/web/20100418130704/http://wiki.theory.org/BitTorrentSpecification, as accessed on Apr. 27, 2010; (Feb. 18, 2010).

Sourabh Satish; Systems and Methods for Determining and Quantifying the Impact of an Application on the Health of a System; U.S. Appl. No. 12/049,751, filed Mar. 17, 2008.

Carey S. Nachenberg; Systems and Methods for Using Reputation Data to Detect Shared-Object-Based Security Threats; U.S. Appl. No. 12/415,834, filed Mar. 31, 2009.

Sourabh Satish; Method for Determining the Health Impact of an Application Based on Information Obtained from Like-Profiled Computing Systems Using Clustering; U.S. Appl. No. 12/056,379, filed Mar. 27, 2008.

Sourabh Satish, et al; Social Trust Based Security Model; U.S. Appl. No. 11/394,846, filed Mar. 31, 2006.

\* cited by examiner

Reputation Information
132

---

****************************************

Target File Name: example.avi
Target File Hash: 0x0349EF9A
****************************************
****************************************

Original Seeder Name: JohnDoe
Original Seeder Reputation: 25%
****************************************
****************************************

Torrent Hosting Site: http://thepiratebay.org
Torrent Hosting Site Reputation: 75%
****************************************
****************************************

IP Addresses of Peers: 127.0.0.1 ... 75.169.229.19
Average Reputation of Peers: 43%
****************************************
****************************************

Torrent Tracking Server URL: http://tracker.openbittorrent.com/announce
Torrent Tracking Server Reputation: 99%
****************************************

Reporting Information
134

----------------------------------------------------------------------
**************************************************
Target File Name: targetfile.avi
Target File Hash: 0xEF9A0349
**************************************************
**************************************************
Original Seeder Name: JohnDoe
**************************************************
**************************************************
Torrent Hosting Site: http://thepiratebay.org
**************************************************
**************************************************
IP Addresses of Peers: 127.1.2.3 ... 68.0.0.1
**************************************************
**************************************************
Torrent Tracking Server URL: http://tracker.openbittorrent.com/announce
**************************************************
----------------------------------------------------------------------

SYSTEMS AND METHODS FOR USING REPUTATION INFORMATION TO EVALUATE THE TRUSTWORTHINESS OF FILES OBTAINED VIA TORRENT TRANSACTIONS

CROSS REFERENCE TO RELATED APPLICATION

This application is a continuation of U.S. application Ser. No. 12/880,581, filed 13 Sep. 2010, the disclosure of which is incorporated, by this reference, in its entirety.

BACKGROUND

Peer-to-peer file-sharing protocols (such as BITTORRENT) are often used to distribute large amounts of data via the Internet. For example, a file provider may choose to reduce the costs typically associated with hosting a large, popular file (such as a game patch or video file) by distributing the file using the BITTORRENT protocol. In the BITTORRENT protocol, peers download pieces of a target file from any number of additional peers while simultaneously providing any previously downloaded pieces of the file to other peers. A group of peers exchanging pieces of a file in this manner is commonly known as a "swarm."

While the BITTORRENT protocol represents a popular method for distributing files (e.g., some researchers estimate that the BITTORRENT protocol alone accounts for up to 50% of all Internet traffic), this protocol also represents a common means for distributing malicious software ("malware"). Unfortunately, torrent hosting sites (i.e., websites that host files, also known as "torrents," that contain the metadata necessary to facilitate a BITTORRENT transaction) generally fail to provide sufficient information to reliably predict whether such files are trustworthy. As such, the instant disclosure identifies a need for a mechanism for evaluating the trustworthiness of files obtained via peer-to-peer file-sharing networks, such as via the BITTORRENT protocol.

SUMMARY

As will be described in greater detail below, the instant disclosure generally relates to systems and methods for using reputation information to evaluate the trustworthiness of files obtained via torrent transactions. In some examples, the systems described herein may accomplish such a task by (1) identifying a torrent file that includes metadata for facilitating a torrent transaction involving a target file, (2) identifying at least one entity involved in the torrent transaction, (3) obtaining reputation information (such as a reputation score) that identifies the trustworthiness of the entity in question, (4) determining, based at least in part on the identified reputation information, that the target file represents a potential security risk, and then (5) performing a security action on the target file.

In some examples, the metadata included within the torrent file may identify a torrent-tracking server capable of coordinating the torrent transaction (i.e., distribution of the target file) among a group of peers within a file-sharing network. Examples of the types of entities that may be involved in such a transaction include a torrent hosting site that hosts the torrent file, the entity that originally provided or made available the target file (the "original seeder"), peers capable of providing ("seeding") or downloading ("leeching") at least a portion of the target file, and/or at least one torrent-tracking server capable of coordinating the torrent transaction.

The systems described herein may identify at least one entity involved in the torrent transaction in a variety of ways. For example, the systems described herein may identify a torrent hosting site that hosts the torrent file by determining (by, e.g., monitoring browser downloads) that the torrent file has been downloaded and then identifying the source (e.g., the torrent hosting site) of the torrent file. The systems described herein may also communicate with the torrent hosting site (which may retain authentication information for original seeders) in order to identify the original seeder of the torrent file.

The systems described herein may also analyze metadata contained within the torrent file itself in order to identify at least one torrent-tracking server capable of facilitating the transaction. In addition, the systems described herein may monitor and parse network traffic in order to identify the IP address of at least one peer involved in the torrent transaction.

In order to determine whether the target file represents a potential security risk, the systems described herein may obtain reputation information for at least one entity involved in the transaction. As will be explained in greater detail below, this reputation information may identify a community's opinion (e.g., an opinion based on information gathered from potentially millions of computing devices, such as the user base of a security-software publisher) on the trustworthiness of the entity in question. In some examples, the reputation of an entity may be based on whether the entity has been involved in prior torrent transactions that involved malware.

For example, if an entity has been involved in several torrent transactions that involved malware-infected target files, the reputation information associated with the entity may indicate that the entity has a poor reputation, indicating a high likelihood that the target file represents a potential security risk. In contrast, if an entity has only been involved in torrent transactions involving legitimate (e.g., non-malicious) target files, the reputation information associated with the entity may indicate that the entity has a good reputation, indicating a low likelihood that the target file represents a potential security risk.

If the systems described herein determine, by analyzing the reputation of at least one entity involved in the torrent transaction, that the target file represents a potential security risk, then these systems may perform a security action on the target file. Examples of such security actions include, without limitation, alerting a user of the potential security risk, blocking access to the target file until overridden by the user, blocking network traffic associated with the torrent transaction, quarantining the target file, and/or deleting the target file.

As will be detailed below, the instant disclosure also describes and illustrates various systems and methods for assigning reputation scores to entities involved in torrent transactions. In one example, the systems described herein may accomplish such a task by (1) receiving reporting information from at least one computing device that identifies, for each computing device, (i) a target file obtained via a torrent transaction, (ii) at least one entity that was involved in the torrent transaction, and (iii) the impact of the target file on the health of the computing device (e.g., whether the target file represents malware or otherwise negatively impacted the stability or performance of the computing device), (2) assigning a reputation score to the entity in question based at least in part on the reporting information received from the computing device(s), and then (3) providing the reputation score assigned to the entity to at least one additional computing device (e.g., an additional peer) participating in an additional torrent transaction that involves the entity. As will be explained in greater detail below, this reputation score may enable the additional computing device to determine whether the additional torrent transaction represents a potential security risk.

As detailed below, by collecting, aggregating, and analyzing reporting information from potentially millions of users involved in torrent transactions, the systems and methods described herein may enable security-software publishers to gain a fairly accurate understanding as to the trustworthiness of entities involved in torrent transactions (such as original seeders, torrent hosting sites, torrent-tracking servers, peers, etc.) based at least in part on the types of files (e.g., malicious or non-malicious) commonly associated with such entities. Moreover, by providing this reputation information to client devices, the systems and methods described herein may enable security software installed on such devices to evaluate and potentially reliably predict the trustworthiness of target files obtainable via torrent transactions based at least in part on the reputations of the entities involved in such transactions, thereby potentially preventing or reducing the proliferation of malware via such transactions.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of exemplary reputation information that identifies a community's opinion on the trustworthiness of entities involved in a torrent transaction.

FIG. 6 is an illustration of exemplary reporting information that identifies both the entities involved in a torrent transaction and the impact of a target file obtained via the torrent transaction on the health of a computing device.

Figure 1:
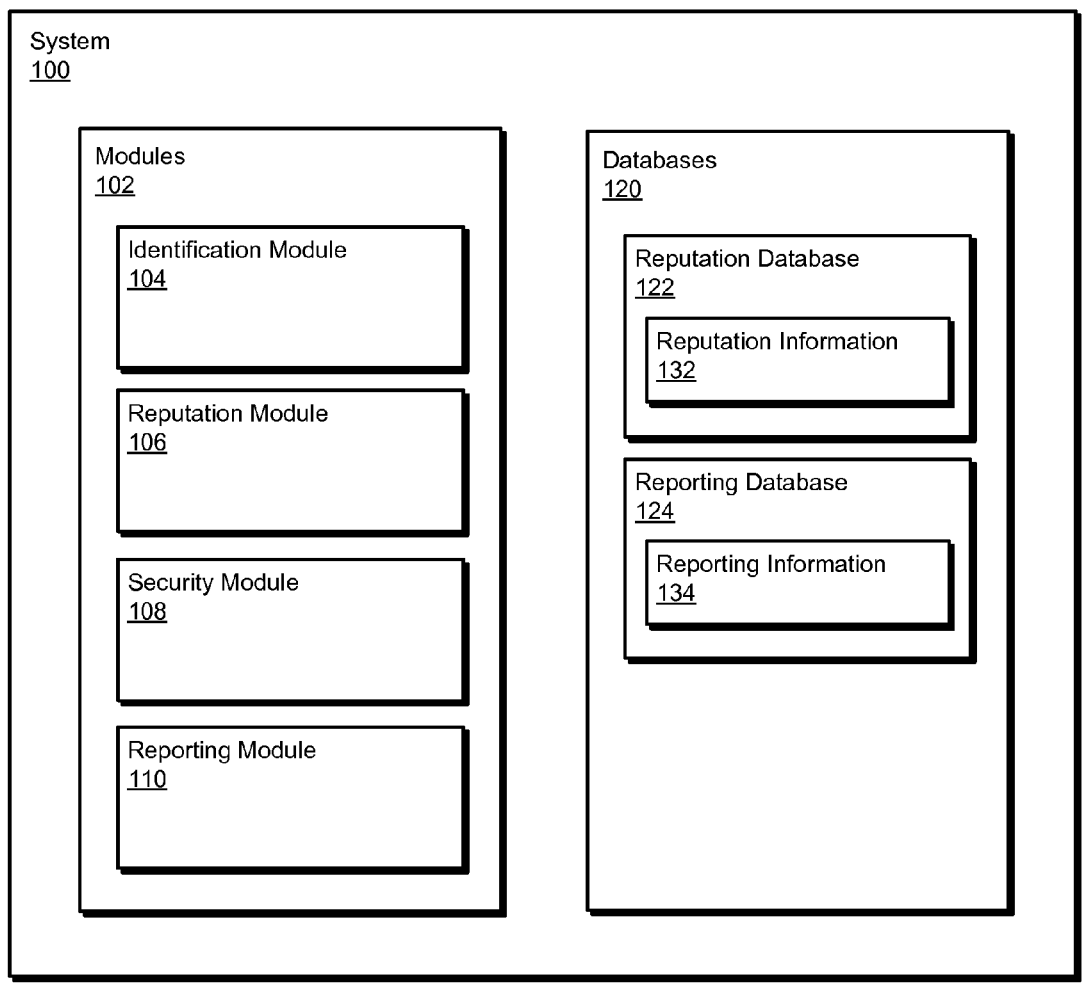
FIG. 1 is a block diagram of an exemplary system for using reputation information to evaluate the trustworthiness of files obtained via torrent transactions.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
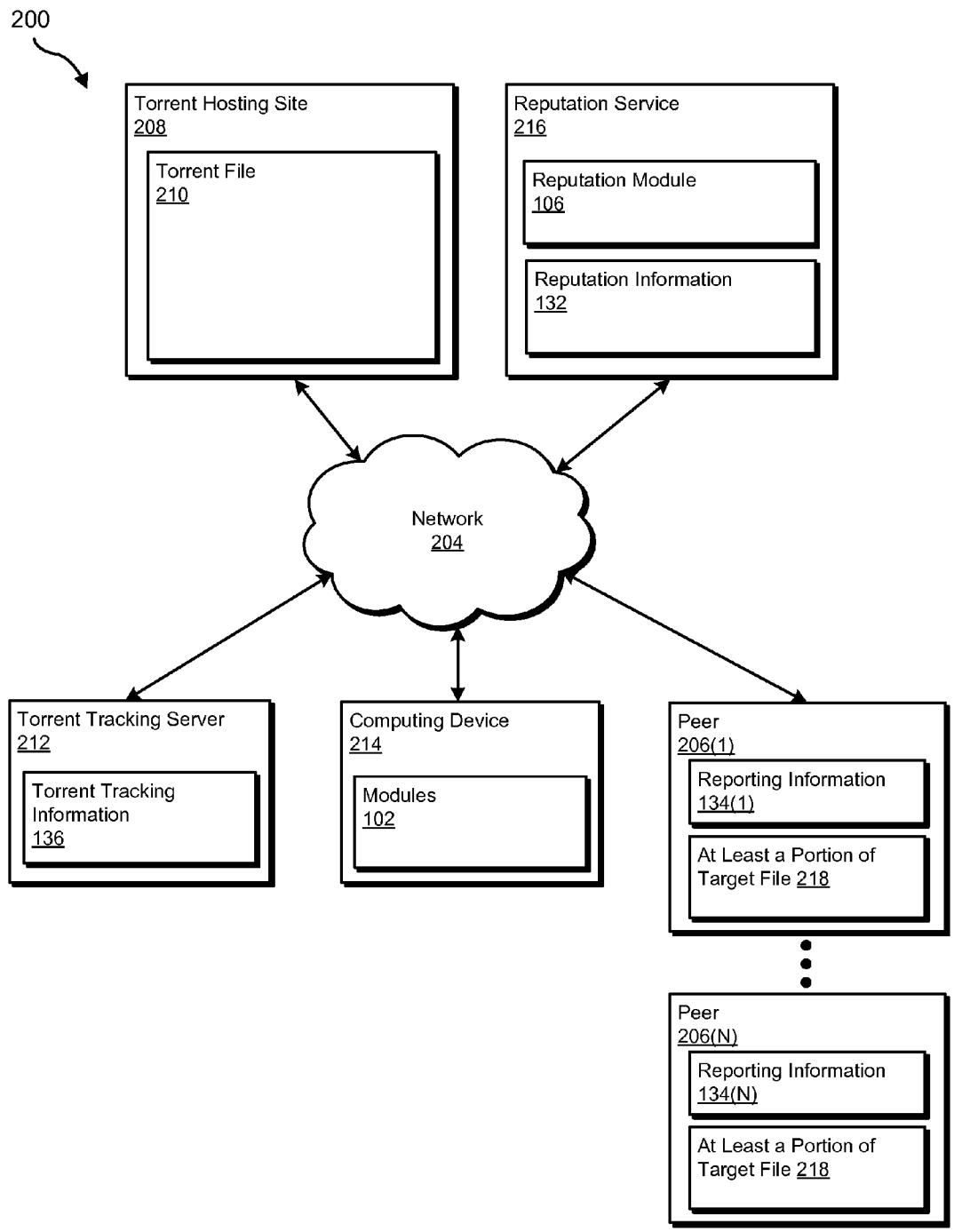
FIG. 2 is a block diagram of an exemplary system for using reputation information to evaluate the trustworthiness of files obtained via torrent transactions.

The following will provide, with reference to FIGS. 1-2, detailed descriptions of exemplary systems for using reputation information to evaluate the trustworthiness of files obtained via torrent transactions. Descriptions of corresponding computer-implemented methods will also be provided in connection with FIGS. 3-7. In addition, descriptions of an exemplary computing system and network architecture capable of implementing one or more of the embodiments described herein will be provided in connection with FIGS. 8 and 9, respectively.

FIG. 1 is a block diagram of an exemplary system 100 for using reputation information to evaluate the trustworthiness of files obtained via torrent transactions. As illustrated in this figure, exemplary system 100 may include one or more modules 102 for performing one or more tasks. For example, and as will be explained in greater detail below, exemplary system 100 may include an identification module 104 programmed to identify a torrent file that includes metadata for facilitating a torrent transaction. Exemplary system 100 may also include a reputation module 106 programmed to identify the reputation of at least one entity involved in the torrent transaction. In addition, exemplary system 100 may include a security module 108 programmed to determine, based at least in part on the reputation of the entity in question, whether the target file represents a potential security risk.

In some embodiments, exemplary system 100 may also include a reporting module 110 programmed to cause a computing device (e.g., a peer within a peer-to-peer file-sharing network) to provide reporting information to a reputation service that identifies a target file obtained by the computing device via a torrent transaction, at least one entity that was involved in the torrent transaction, and/or the impact of the target file on the health of the computing device. Although illustrated as separate elements, one or more of modules 102 in FIG. 1 may represent portions of a single module or application. One or more of modules 120 in FIG. 1 may also represent a portion of multiple computing devices.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., reputation service 216, computing device 214, and/or peers 206(1)-(N)), computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a reputation database 122 for storing reputation information 132 that identifies a community's opinion on the trustworthiness of various entities that may participate in torrent transactions (e.g., torrent hosting sites, torrent-tracking servers, peers, original seeders, etc.). Exemplary system 100 may also include a reporting database 124 for storing reporting information 134 received from potentially millions of computing devices within a community (such as the user base of a security-software publisher). Reporting information 134 may identify, for each computing device, a target file obtained by the computing device via a torrent transaction, at least one entity that was involved in the torrent transaction, and/or the impact of the target file on the health of the computing device. As will be explained in greater detail below, by collecting, aggregating, and analyzing this reporting information from potentially millions of users, a reputation service (such as reputation service 216 in FIG. 2) may be able to gain a fairly accurate understanding as to the trustworthiness of entities involved in torrent transactions based at least in part on the types of files (e.g., malicious or non-malicious) commonly associated with such entities.

Databases 120 in FIG. 1 may represent a portion of one or more computing devices. For example, databases 120 may represent a portion of reputation service 216, computing device 214, and/or peers 206(1)-(N) in FIG. 2, computing system 810 in FIG. 8, and/or portions of exemplary network architecture 900 in FIG. 9. Alternatively, databases 120 in FIG. 1 may represent one or more physically separate devices capable of being accessed by a computing device, such as reputation service 216, computing device 214, and/or peers 206(1)-(N) in FIG. 2, computing system 810 in FIG. 8, and/or portions of exemplary network architecture 900 in FIG. 9.

Exemplary system 100 in FIG. 1 may be deployed in a variety of ways. For example, all or a portion of exemplary system 100 may represent portions of exemplary system 200 in FIG. 2. As shown in FIG. 2, system 200 may include a network 204 that facilitates communication between a torrent hosting site 208, a reputation service 216, a torrent-tracking server 212, a computing device 214, and a plurality of peers 206(1)-(N).

In one embodiment, and as will be described in greater detail below, one or more of modules 102 may program computing device 214 to evaluate the trustworthiness of a target file (e.g., target file 218) obtainable via a torrent transaction by (1) identifying a torrent file (e.g., torrent file 210 obtained by computing device 214 from torrent hosting site 208 via network 204) that contains metadata for facilitating the torrent transaction, (2) identifying at least one entity involved in the torrent transaction (e.g., torrent hosting site 208, torrent-tracking server 212, the original seeder of the target file, and/or peers 206(1)-(N)), (3) obtaining reputation information (from, e.g., reputation service 216) that identifies the trustworthiness of the entity in question, (4) determining, based at least in part on the identified reputation information, that the target file represents a potential security risk, and then (5) performing a security action on the target file.

Computing device 214 and peers 206(1)-(N) generally represent any type or form of computing device capable of reading computer-executable instructions. Examples of computing device 214 and peers 206(1)-(N) include, without limitation, laptops, desktops, servers, cellular phones, personal digital assistants (PDAs), multimedia players, embedded systems, combinations of one or more of the same, exemplary computing system 810 in FIG. 8, or any other suitable computing device. In one example, peers (1)-(N) may represent peers within a peer-to-peer file-sharing network, such as a BITTORRENT swarm. In this example, peers 206(1)-(N) may download pieces of a target file (e.g., target file 218) from one other while simultaneously providing any previously downloaded pieces of the target file to one another. Although not illustrated in FIG. 2, each of peers 206(1)-(N) may include one or more of modules 102.

Torrent hosting site 208 generally represents any type or form of computing device that is capable of hosting a torrent file. In addition, torrent-tracking server 212 generally represents any type or form of computing device that is capable of coordinating torrent transactions. Torrent-tracking server 212 may include torrent tracking information 136 that enables torrent-tracking server 212 to coordinate torrent transactions by identifying one or more peers (e.g., peers 206(1)-(N)) capable of seeding and/or leeching a target file within a file-sharing network. Examples of torrent-tracking server 212 include, without limitation, application servers and database servers configured to provide various database services and/or run certain software applications.

Reputation service 216 generally represents any type or form of computing device that is capable of providing reputation information (such as reputations scores) for entities involved in torrent transactions. As will be explained in greater detail below, reputation service 216 may assign reputations to entities involved in torrent transactions based on reputation information collected from potentially millions of users within a community (such as the user base of a security-software publisher).

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 900 in FIG. 9, or the like. Network 204 may facilitate communication or data transfer using wireless or wired connections. In one embodiment, network 204 may facilitate communication among torrent hosting site 208, reputation service 216, torrent-tracking server 212, computing device 214, and peers 206(1)-(N).

Figure 3:
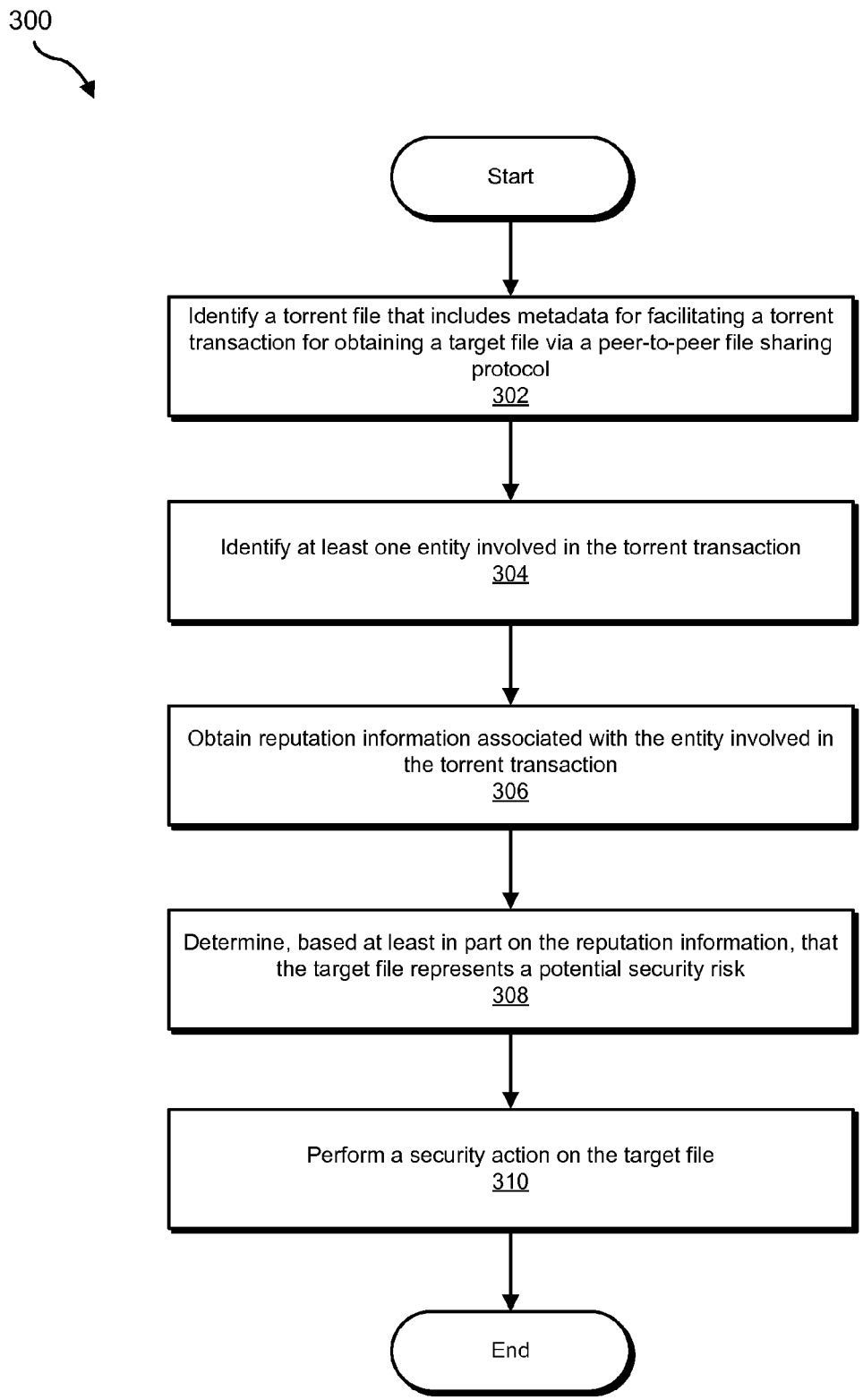
FIG. 3 is a flow diagram of an exemplary method for using reputation information to evaluate the trustworthiness of files obtained via torrent transactions.

FIG. 3 is a flow diagram of an exemplary computer-implemented method 300 for using reputation information to evaluate the trustworthiness of files obtained via torrent transactions. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a torrent file that includes metadata for facilitating a torrent transaction that involves obtaining a target file via a peer-to-peer file-sharing protocol (such as BITTORRENT). For example, identification module 104 may, as part of computing device 214 in FIG. 2, identify torrent file 210, which may include metadata for facilitating a torrent transaction for obtaining a target file 218 from peers 206(1)-(N) via the BITTORRENT protocol. In this example, the metadata included within torrent file 210 may identify a torrent-tracking server (e.g., torrent-tracking server 212) capable of coordinating the torrent transaction.

The phrase "torrent transaction," as used herein, generally refers to the distribution of a target file identified within a torrent file via a peer-to-peer file-sharing protocol, such as BITTORRENT. In this disclosure, each instance of distributing a target file to a different peer may constitute a different torrent transaction. Examples of target files that may be distributed via torrent transactions include, without limitation, executable files, non-executable files, media files (such as video files and/or audio files), archived files (such as ZIP files), compressed files, and/or any other types of suitable files.

The systems described herein may perform step 302 in a variety of ways. In some examples, the systems described herein may identify a torrent file downloaded via a browser. For example, identification module 104 may, as part of computing device 214 in FIG. 2, identify files downloaded by computing device 214 that end in the ".torrent" extension.

Figure 4:
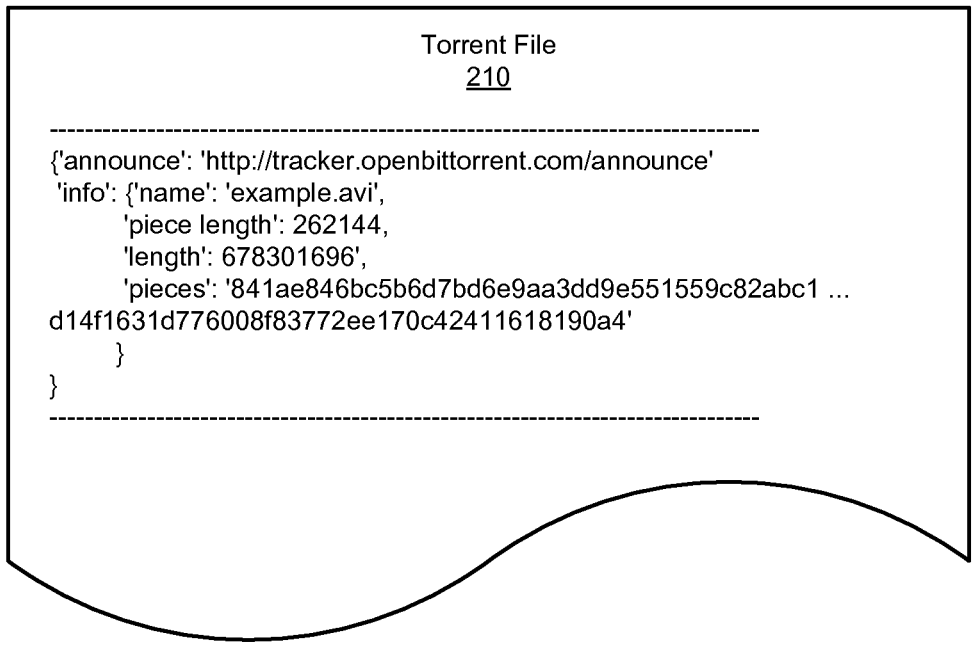
FIG. 4 is an illustration of an exemplary torrent file that contains metadata for facilitating a torrent transaction.

FIG. 4 is an illustration of an exemplary torrent file 210 that contains metadata for facilitating a torrent transaction. As detailed above, torrent file 210 may contain metadata for facilitating a torrent transaction involving target file 218. For example, torrent file 210 may provide a URL for a torrent tracking site capable of coordinating the torrent transaction (in this example, "'announce': 'http://tracker.openbittorrent.com/announce'"), a name that uniquely identifies target file 218 (in this example, "'name': 'example.avi'"), the number of bytes in each piece of target file 218 to be obtained from one or more of peers 206(1)-(N) (in this example, "'piece length': 262144"), a concatenation for each piece of target file 218 available for download (in this example, "'pieces': '841ae846bc5b6d7bd6e9aa3dd9e551559c82abc1 . . . d14f1631d776008f83772ee170c42411618190a4'"), and the number of bytes in the entire target file 218 (in this example, "'length': 678301696'").

Returning to FIG. 3, at step 304 the systems described herein may identify at least one entity involved in the torrent transaction. For example, identification module 104 may, as part of computing device 214 in FIG. 2, identify at least one entity capable of participating in a torrent transaction involving target file 218. Examples of such entities include, without limitation, torrent hosting sites (such as http://thepiratebay.org), the original seeder that originally provided or made available the target file, peers capable of providing (i.e., seeding) or obtaining (i.e., leeching) at least a portion of the target file, a torrent-tracking server capable of coordinating the torrent transaction, and/or any other suitable entities involved in the torrent transaction.

The systems disclosed herein may perform step 304 in a variety of ways. In some examples, in order to identify the original seeder, the systems described herein may communicate with the torrent hosting site in order to identify a relationship between the original seeder and the torrent file. For example, identification module 104 may, as part of computing device 214 and/or reputation service 216 in FIG. 2, communicate with torrent hosting site 208 in order to identify a username or profile associated with the original seeder that uploaded torrent file 210 to torrent hosting site 208. In this example, torrent hosting site 208 may implement a policy requiring authentication of original seeders in order to track whether such original seeders provide any torrent files associated with malware-infected target files.

In another example, the systems described herein may identify the relationship between the original seeder and the torrent file simply by analyzing metadata included within the torrent file itself. For example, although not illustrated in FIG. 4, torrent file 210 may contain metadata that identifies the original seeder that uploaded torrent file 210 to torrent hosting site 208. In this example, identification module 104 may identify the original seeder by simply analyzing the metadata included within torrent file 210.

In one example, the systems described herein may identify the torrent hosting site that hosts the torrent file by (1) determining, by monitoring browser downloads, that the torrent file has been downloaded and then (2) identifying a relationship between the torrent hosting site and the torrent file. For example, identification module 104 may, by monitoring a browser configured to execute on computing device 214, determine that torrent file 210 has been downloaded from a URL associated with torrent hosting site 208.

In some examples, the systems described herein may identify at least one peer involved in the torrent transaction by monitoring and parsing network traffic. For example, identification module 104 may, after computing device 214 in FIG. 2 begins participating in a torrent transaction involving target file 218 with one or more of peers 206(1)-(N), monitor network traffic generated by a torrent client running on computing device 214. In this example, identification module 104 may identify, by parsing this network traffic, the IP address of peer 206(1), indicating that peer 206(1) has been seeding and/or leeching at least a portion of target file 218 to or from computing device 214 during the torrent transaction.

In some embodiments, the torrent file may contain metadata that identifies a torrent-tracking server capable of coordinating the torrent transaction. In this example, the systems described herein may identify the torrent-tracking server by simply analyzing the metadata included within the torrent file itself. For example, identification module 104 may, by analyzing torrent file 210, identify a URL associated with torrent-tracking server 212. In this example, torrent-tracking server 210 may be configured to use torrent tracking information 136 to coordinate a torrent transaction involving target file 218 by identifying one or more peers (e.g., peers 206(1)-(N)) capable of seeding and/or leeching at least a portion of target file 218.

In some examples, the systems described herein may identify at least one entity involved in the torrent transaction prior to actually participating in the torrent transaction. For example, identification module 104 may identify torrent hosting site 208 and/or torrent-tracking server 212 prior to attempting to obtain target file 218 by simply analyzing metadata contained within torrent file 210. In other examples, the systems described herein may identify at least one entity involved in the torrent transaction subsequent to beginning participation in the torrent transaction. For example, identification module 104 may identify one or more of peers 206(1)-(N) upon attempting to obtain at least a portion of target file 218 using a torrent client.

At step 306, the systems described herein may obtain information that identifies the reputation of the entity identified in step 304. For example, reputation module 106 may, as part of computing device 214 in FIG. 2, obtain reputation information 132 from reputation service 216 that identifies the trustworthiness of the entity in question (e.g., torrent hosting site 208, the original seeder that uploaded torrent file 210, torrent-tracking server 212, and/or at least one of peers 206(1)-(N)).

The term "reputation information," as used herein, generally refers to information that conveys the opinion of a specific community (such as the user base of a security-software publisher) on the trustworthiness or legitimacy of a target file and/or entity (such as an original seeder, torrent hosting site, torrent-tracking server, peer, etc.). Examples of reputation information include, without limitation, reputation scores (where, for example, high reputation scores indicate that a file or entity is generally trusted within a community and low reputation scores indicate that a file or entity is generally untrusted within a community), prevalence information (e.g., information that identifies the number or percentage of user devices within a community that contain an instance of a particular file), or any other information that may be used to identify a community's opinion on the trustworthiness or legitimacy of a file or entity.

FIG. 5 is an illustration of exemplary reputation information 132. As illustrated in this figure, reputation information 132 may include or identify the file name of target file 218, a file hash that uniquely identifies target file 218, the name (e.g., the username or profile identifier) of the entity that originally provided or made available target file 218 (i.e., the original seeder), a URL (or another identifier) associated with torrent hosting site 208, a reputation score associated with torrent hosting site 208, the IP address(es) of one or more of peers 206(1)-(N), a reputation score associated with one or more of peers 206(1)-(N) (including, e.g., an average reputation score of one or more of peers 206(1)-(N)), a URL (or another identifier) associated with torrent-tracking server 212, and/or a reputation score associated with torrent-tracking server 212. Although FIG. 5 illustrates reputation information 132 associated with various entities involved in a torrent transaction, the reputation information obtained in step 306 may be limited to a community's opinion on fewer entities (e.g., a single entity).

The systems described herein may perform step 306 in a variety of ways. In some examples, the systems described herein may obtain the reputation information from a reputation service configured to formulate reputation information by collecting, aggregating, and analyzing reporting information from computing devices within a community (such as one or more of peers 206(1)-(N)). For example, reputation module 106 may, as part of computing device 214 in FIG. 2, retrieve reputation information 132 from reputation service 216 that has been formulated to represent a community's opinion on the trustworthiness of the entity in question based on reporting information collected, aggregated, and analyzed from one or more of peers 206(1)-(N).

As detailed above, reputation services may generate reputation information for target files by collecting, aggregating, and analyzing data from user devices within a community (such as the user base of a security-software publisher). Examples of the types of reporting information that may be gathered from user devices within a community and used to determine the trustworthiness of target files include, without limitation, information that identifies the overall health of a user device (i.e., information that identifies the performance, stability, and/or state of security of the user device), information that identifies one or more target files obtained via a peer-to-peer file-sharing protocol (including information that identifies the original seeder and/or the source or origin of such files), information that identifies the impact of such files on the health of the user device (e.g., information that identifies the health of the user device both before and after a target file is obtained via a peer-to-peer file-sharing protocol), and any other information that may be used to evaluate the trustworthiness of target files obtained via torrent transactions. In some examples, by collecting, aggregating, and analyzing such reporting information from potentially millions of user devices within a community (such as the user base of a security-software publisher), a reputation service may be able to gain a fairly accurate understanding as to the trustworthiness of a target file obtained via a torrent transaction.

In some examples, reputation services may assign reputation scores to entities based at least in part on the trustworthiness of the files commonly associated with such entities. For example, if an entity has been involved in one or more torrent transactions involving target files with poor reputations (e.g., malware-infected files), a reputation service may assign a poor reputation score to the entity in question. For example, an original seeder reputation score of 25% shown as part of reputation information 132 in FIG. 5 may indicate that the original seeder (JohnDoe, in this example) that uploaded torrent file 210 to torrent hosting site 208 has been involved in multiple torrent transactions involving malware-infected files. As will be explained in greater detail below, this poor reputation may indicate a high likelihood that future torrent transactions involving this original seeder represent a potential security risk.

In contrast, if an entity has been involved mostly in torrent transactions involving target files with good reputations (e.g., legitimate files), the reputation service may assign a good reputation score to the entity in question. For example, a torrent-tracking server reputation of 99% shown as part of reputation information 132 in FIG. 5 may indicate that torrent-tracking server 212 has not been involved in many (if any) torrent transactions involving malware-infected files. This good reputation may indicate a low likelihood that future torrent transactions involving torrent-tracking server 212 represent a potential security risk. As will be described in greater detail below, security module 108 may apply different magnitudes (or weights) to reputation scores in order to determine whether a particular torrent transaction (or target file associated with the same) represents a potential security risk.

Returning to FIG. 3, at step 308 the systems described herein may determine, based at least in part on the reputation information obtained in step 306, that the target file represents a potential security risk. For example, security module 108 may, as part of computing device 214 in FIG. 2, determine, by analyzing reputation information 132 obtained from reputation service 216, that the poor reputation of torrent hosting site 208, the original seeder that uploaded torrent file 210 to torrent hosting site 208, torrent-tracking server 212, and/or one or more of peers 206(1)-(N) indicates that target file 218 represents a potential security risk. This potential security risk may include the potential for introducing any type or form of unwanted software component (such as malware, computer viruses, spyware, worms, Trojan horses, adware, crimeware, and/or rootkits) into a computing device.

The systems described herein may perform step 308 in a variety of ways. In some examples, the systems described herein may apply one or more reputation scores identified within the reputation information obtained in step 306 to a mathematical formula. For example, security module 108 may input the reputation scores identified within reputation information 132 into a mathematical formula that applies different magnitudes or weights to the entities in order to make certain reputation scores more or less influential in determining whether target file 218 represents a potential security risk. In this example, security module 108 may calculate a result based at least in part on the reputation scores as applied to the mathematical formula, and upon determining that the result fails to reach a particular threshold, security module 108 may determine that target file 218 represents a security risk.

In other examples, the systems described herein may determine whether any reputation scores identified within the reputation information are below a particular threshold. For example, security module 108 may analyze the reputation scores identified within reputation information 132 in order to determine whether any of the reputation scores are below 40% (on a scale of 0-100%). For example, upon identifying the reputation score for the original seeder, security module 108 may determine that, because the reputation score for the original seeder is below 40%, target file 218 represents a potential security risk.

In some examples, the systems described herein may also determine that the target file represents a potential security risk by (1) obtaining at least a portion of the target file via the torrent transaction and then (2) determining that the target file negatively impacts the health of the computing device. For example, if reputation information 132 is unable to provide a sufficient basis for determining whether target file 218 represents a potential security risk, security module 108 may allow at least a portion of target file 218 to be downloaded by computing device 214. In this example, after downloading all or a portion of target file 218, security module 108 may analyze the health of computing device 214 and determine that target file 218 has negatively impacted the health of computing device 214 (by, e.g., lowering the overall performance, stability, and/or state of security of computing device 214).

At step 310, the systems described herein may perform a security action on the target file. For example, security module 108 may, as part of computing device 214 in FIG. 2, perform a security action on target file 218 either prior to or after obtaining all or a portion of target file 218 from one or more of peers 206(1)-(N) via the BITTORRENT protocol. For example, security module 108 may alert a user of the potential security risk, block access to the target file until overridden by the user, block network traffic associated with the torrent transaction, quarantine the target file, and/or delete the target file.

The systems described herein may perform step 310 in a variety of ways. For example, security module 108 may alert a user of computing device 214 of the potential security risk by causing a dialog to be displayed on an output component (such as a monitor) of computing device 214. In other examples, in order to block network traffic associated with the torrent transaction, security module 108 may monitor network traffic involving computing device 214 and then block all network traffic associated with the BITTORRENT protocol. Upon completion of step 310, exemplary method 300 in FIG. 3 may terminate.

In some examples, the systems described herein may provide reporting information to a reputation service in order to enable the reputation service to update the reputation information for the entities involved in torrent transaction. For example, reporting module 110 may, as part of computing device 214, provide reporting information to reputation service 216. As detailed above, this reporting information may identify (1) the target file involved in the torrent transaction, (2) at least one entity associated with the torrent transaction, and/or (3) the impact of the target file on the health of the computing device (if, e.g., the computing device downloaded all or a portion of the target file).

Figure 7:
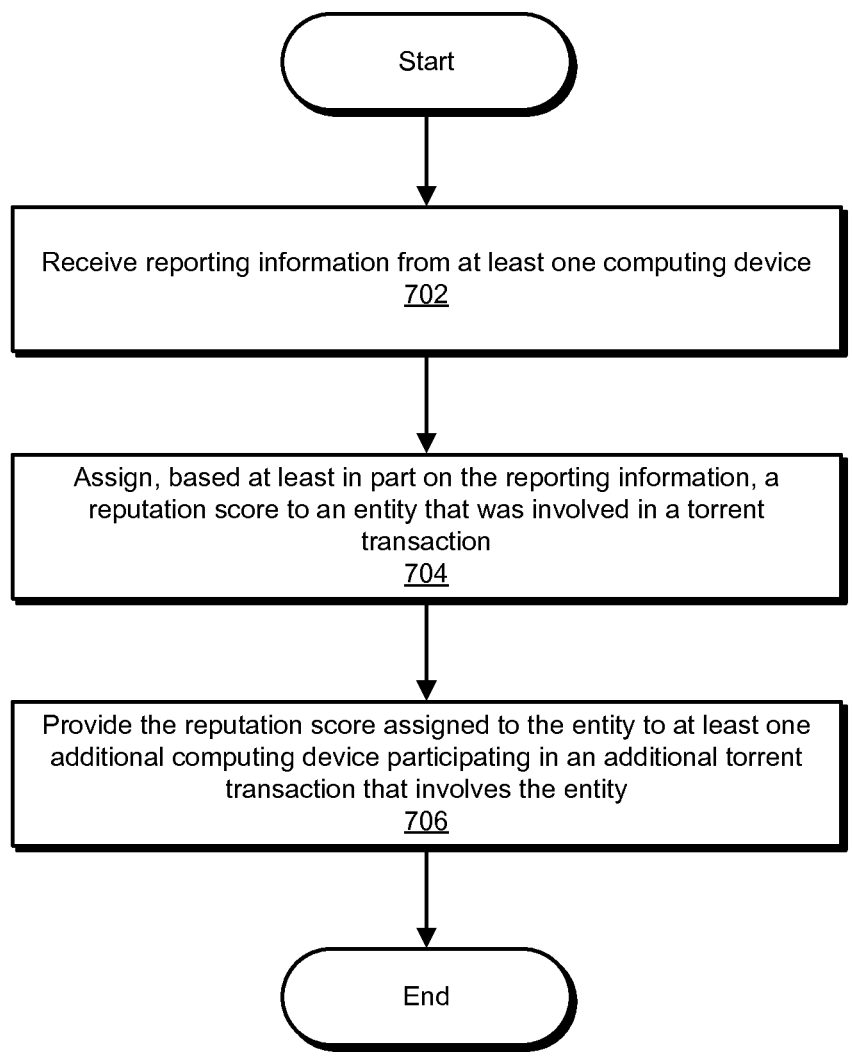
FIG. 7 is a flow diagram of an exemplary method for assigning reputation scores to entities involved in torrent transactions.

FIG. 7 is a flow diagram of an exemplary computer-implemented method 700 for assigning reputation scores to entities involved in torrent transactions (such as the torrent transactions discussed above in connection with FIG. 3). The steps shown in FIG. 7 may be performed by any suitable computer-executable code and/or computing system. In some embodiments, the steps shown in FIG. 7 may be performed by one or more of the components of system 100 in FIG. 1, system 200 in FIG. 2, computing system 810 in FIG. 8, and/or portions of exemplary network architecture 900 in FIG. 9.

As illustrated in FIG. 7, at step 702 one or more of the various systems described herein may receive reporting information from at least one computing device (such as one or more of peers 206(1)-(N)). As detailed above, this reporting information may identify a target file obtained via a torrent transaction, at least one entity that was involved in the torrent transaction, and/or the impact of the target file on the health of the computing device. For example, reporting module 110 may, as part of reputation service 216 in FIG. 2, receive reporting information 134(1) from peer 206(1) that identifies (1) a target file (e.g., target file 218) that was obtained by peer 206(1) via a torrent transaction, (2) the identities of each entity that was involved in the torrent transaction, and/or (3) the impact of target file 218 on the health of peer 206(1).

FIG. 6 is an illustration of exemplary reporting information 134(1) that may be received from a peer upon completion of a torrent transaction. As illustrated in this figure, reputation information may include information that identifies the name of the target file obtained via the torrent transaction, a target file hash that uniquely identifies the target file, the name of the original seeder (such as a username or profile identifier of the original seeder that originally made the target file available), the URL (or another identifier) of the torrent hosting site that hosted the torrent file, the IP address(es) of one or more of peers (seeders and/or leechers) that participated in the torrent transaction, and/or the URL (or another identifier) of at least one torrent-tracking server that participated in the torrent transaction. Although FIG. 6 illustrates reporting information 134(1) associated with various entities involved in a torrent transaction, the reporting information received in step 702 may identify fewer entities (e.g., a single entity) involved in the torrent transaction.

Returning to FIG. 7, at step 704 the systems described herein may assign, based at least in part on the reporting information received from the computing device, a reputation score to at least one entity involved in the torrent transaction. For example, reputation module 106 may, as part of reputation service 216 in FIG. 2, formulate and assign, based at least in part on the reporting information received in step 702, a reputation score to at least one entity involved in the torrent transaction reported by peer 206(1).

As detailed above, the systems described herein may be able to gain a fairly accurate understanding as to the trustworthiness of a target file obtained via a torrent transaction by collecting, aggregating, and analyzing reporting information from potentially millions of user devices within a community (such as the user base of a security-software publisher). In some examples, the systems described herein may also assign reputation scores to entities involved in torrent transactions based at least in part on the trustworthiness of the files involved in such transactions. For example, if an entity has been involved in one or more torrent transactions involving target files with poor reputations (e.g., malware-infected files), reputation module 106 may assign a poor reputation score to the entity in question. As will be explained in greater detail below, this poor reputation score may indicate a high likelihood that future torrent transactions involving this original seeder represent a potential security risk.

In contrast, if an entity has been involved mostly in torrent transactions involving target files with good reputations (e.g., legitimate files), then reputation module 106 may assign a good reputation score to the entity in question. This good reputation may indicate a low likelihood that future torrent transactions involving the entity represent a potential security risk.

At step 706, the systems described herein may provide the reputation score assigned to the entity to at least one additional computing device (such as computing device 214) participating in an additional torrent transaction that involves the entity in question. As detailed above, this reputation score may enable the additional computing device to determine whether the additional torrent transaction involving the entity in question represents a potential security risk.

The systems described herein may perform step 706 in a variety of ways. In one example, reputation module 106 may, as part of reputation service 216 in FIG. 2, receive a request from computing device 214 to provide reputation information for the entity in question. In this example, reputation module 106 may provide the requested reputation information to computing device 214 in response to the request. As detailed above, this reputation information may enable computing device 214 to determine whether to participate in torrent transactions involving the entity in question. Upon completion of step 706, exemplary method 700 in FIG. 7 may terminate.

As explained above, by collecting, aggregating, and analyzing reporting information from potentially millions of users involved in torrent transactions, the systems and methods described herein may enable security-software publishers to gain a fairly accurate understanding as to the trustworthiness of entities involved in torrent transactions (such as original seeders, torrent hosting sites, torrent-tracking servers, peers, etc.) based at least in part on the types of files (e.g., malicious or non-malicious) commonly associated with such entities. Moreover, by providing this reputation information to client devices, the systems and methods described herein may enable security software installed on such devices to evaluate and potentially reliably predict the trustworthiness of target files obtainable via torrent transactions based at least in part on the reputations of the entities involved in such transactions, thereby potentially preventing or reducing the proliferation of malware via such transactions.

Figure 8:
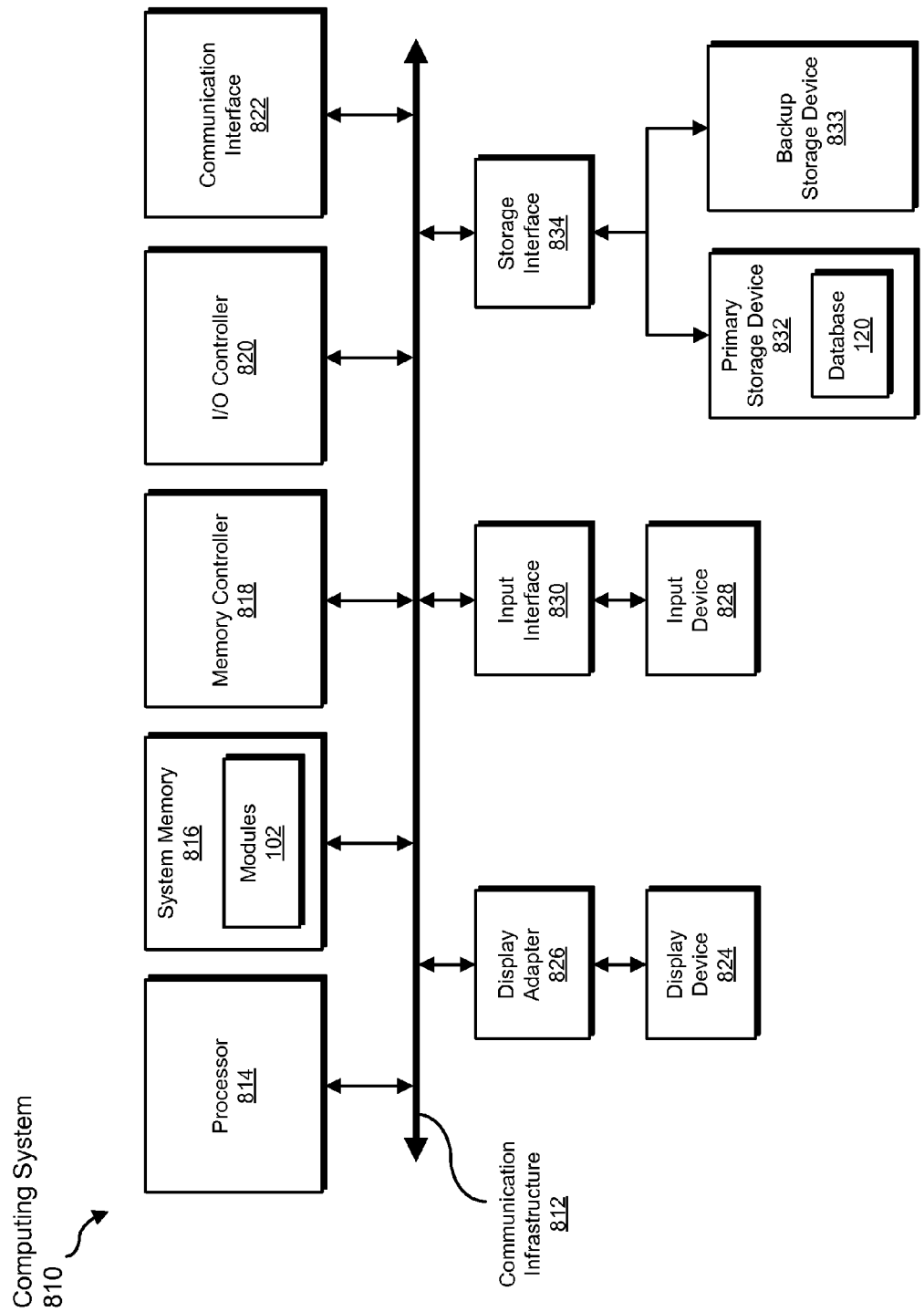
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the identifying, obtaining, determining, performing, providing, reporting, receiving, assigning, communicating, accessing, analyzing, monitoring, parsing, alerting, blocking, quarantining, and deleting steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the steps or features described and/or illustrated herein, such as identifying, obtaining, determining, performing, providing, reporting, receiving, assigning, communicating, accessing, analyzing, monitoring, parsing, alerting, blocking, quarantining, and deleting.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the identifying, obtaining, determining, performing, providing, reporting, receiving, assigning, communicating, accessing, analyzing, monitoring, parsing, alerting, blocking, quarantining, and deleting steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the identifying, obtaining, determining, performing, providing, reporting, receiving, assigning, communicating, accessing, analyzing, monitoring, parsing, alerting, blocking, quarantining, and deleting steps disclosed herein. Communication interface 822 may also be used to perform and/or be a means for performing other steps and features set forth in the instant disclosure.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the identifying, obtaining, determining, performing, providing, reporting, receiving, assigning, communicating, accessing, analyzing, monitoring, parsing, alerting, blocking, quarantining, and deleting steps disclosed herein. Input device 828 may also be used to perform and/or be a means for performing other steps and features set forth in the instant disclosure.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810. In one example, databases 120 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, storage devices 832 and 833 may be used, for example, to perform and/or be a means for performing, either alone or in combination with other elements, one or more of the identifying, obtaining, determining, performing, providing, reporting, receiving, assigning, communicating, accessing, analyzing, monitoring, parsing, alerting, blocking, quarantining, and deleting steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
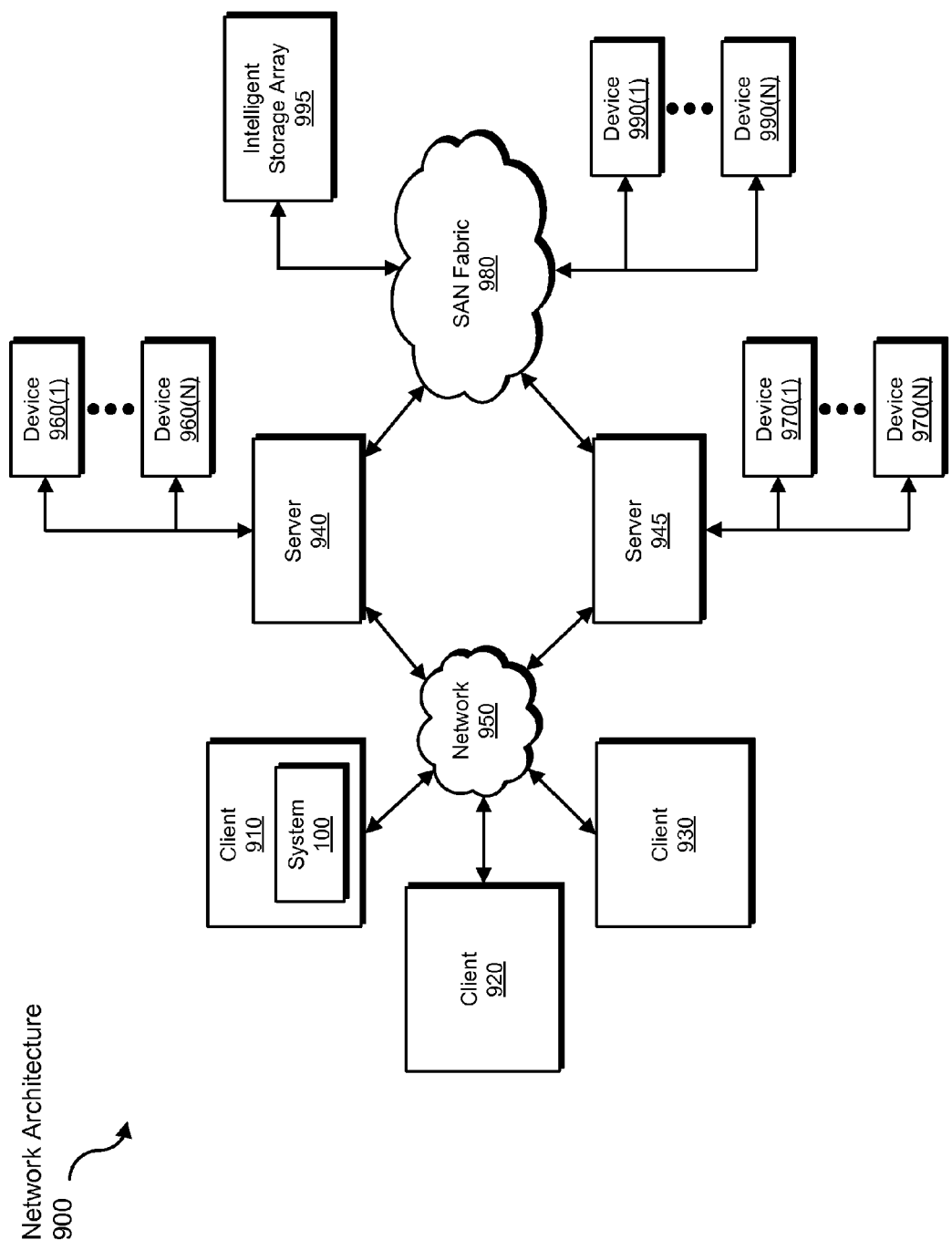
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8.

Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet. In one example, client systems 910, 920, and/or 930 and/or servers 940 and/or 945 may include system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the identifying, obtaining, determining, performing, providing, reporting, receiving, assigning, communicating, accessing, analyzing, monitoring, parsing, alerting, blocking, quarantining, and deleting steps disclosed herein. Network architecture 900 may also be used to perform and/or be a means for performing other steps and features set forth in the instant disclosure.

As detailed above, computing system 810 and/or one or more components of network architecture 900 may perform and/or be a means for performing, either alone or in combination with other elements, one or more steps of an exemplary method for using reputation information to evaluate the trustworthiness of files obtained via torrent transactions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, modules 102 in FIG. 2 may transform computing device 214 into a device capable of determining whether a torrent transaction represents a potential security risk.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

The invention claimed is:

1. A computer-implemented method for using reputation information to evaluate the trustworthiness of files obtained via torrent transactions, at least a portion of the method being performed by a computing device comprising at least one processor, the method comprising:
   identifying, by the computing device, a torrent file that comprises metadata for facilitating a torrent transaction for obtaining a target file via a peer-to-peer file-sharing protocol;
   identifying, by the computing device, a swarm of client devices involved in the torrent transaction by seeding or downloading at least a portion of the target file;
   obtaining, by the computing device, reputation information for the swarm of client devices involved in the torrent transaction, wherein the reputation information:
      identifies a state of security of each client device in the swarm;
      identifies an overall health of each client device in the swarm; and
      identifies an impact of the target file on the swarm of client devices;
   identifying, based at least in part on the reputation information, a percentage of the client devices in the swarm whose overall health fails to reach a particular threshold;
   identifying, based at least in part on the reputation information, a percentage of the client devices in the swarm whose state of security fails to reach a certain threshold;
   determining, by the computing device, that the target file represents a potential security risk based at least in part on:
      the percentage of the swarm of client devices whose state of security fails to reach the certain threshold;
      the percentage of the swarm of client devices whose overall health fails to reach the particular threshold; and
      the impact of the target file on the swarm of client devices; and
   performing, by the computing device, a security action on the target file, wherein the security action comprises blocking network traffic associated with the torrent transaction.

2. The method of claim 1, wherein identifying the swarm of client devices involved in the torrent transaction comprises identifying at least one of:
   an original seeder that uploaded the torrent file to a torrent hosting site;
   a client device capable of providing at least a portion of the target file; and
   a client device attempting to download at least a portion of the target file.

3. The method of claim 2, wherein identifying the original seeder that uploaded the torrent file to the torrent hosting site comprises at least one of:
   communicating with the torrent hosting site to identify a relationship between the original seeder and the torrent file;
   accessing authentication information associated with a torrent hosting site that identifies the relationship between the original seeder and the torrent file; and
   analyzing the metadata within the torrent file to identify the relationship between the original seeder and the torrent file.

4. The method of claim 2, wherein identifying the client device capable of providing the target file or the client device attempting to download the target file comprises:
   monitoring network traffic; and
   parsing the network traffic to identify an IP address of the client device.

5. The method of claim 1, wherein obtaining the reputation information for the swarm of client devices involved in the torrent transaction comprises obtaining the reputation information from a reputation service.

6. The method of claim 1, wherein performing the security action on the target file further comprises at least one of:
   alerting a user of a computing system of the potential security risk;
   blocking access to the target file until overridden by the user;
   quarantining the target file; and
   deleting the target file.

7. The method of claim 1, wherein performing the security action comprises at least one of:
   performing the security action prior to obtaining any portion of the target file;
   performing the security action after obtaining a portion of the target file; and
   performing the security action after obtaining all of the target file.

8. The method of claim 1, wherein determining that the target file represents the potential security risk further comprises:
obtaining at least a portion of the target file; and
determining that the target file negatively impacts the health of the computing device.

9. The method of claim 8, further comprising providing reporting information to a reputation service that identifies at least one of:
the target file obtained via the torrent transaction;
the swarm of client devices involved in the torrent transaction; and
the negative impact of the target file on the health of the swarm of client devices.

10. The method of claim 1, wherein:
obtaining the reputation information for the swarm of client devices comprises obtaining reputation information for a new client device that joined the swarm during the torrent transaction.

11. The method of claim 1, wherein the target file comprises a non-executable file.

12. The method of claim 1, wherein:
the reputation information further identifies a reputation of each client device in the swarm; and
determining that the target file represents a potential security risk comprises:
identifying, based at least in part on the reputation information, a percentage of the client devices in the swarm whose reputation fails to reach a particular threshold; and
determining, based at least in part on the percentage of the client devices in the swarm whose reputation fails to reach the particular threshold, that the target file represents a potential security risk.

13. A computer-implemented method for assigning reputation scores to entities involved in torrent transactions, at least a portion of the method being performed by a server comprising at least one processor, the method comprising:
receiving, by the server from a swarm of client devices involved in a torrent transaction by seeding or downloading at least a portion of a target file, reporting information that identifies:
a state of security of each client device in the swarm;
the health of the swarm of client devices; and
an impact of the target file on the swarm of client devices;
assigning, by the server, a reputation score to the swarm of client devices based at least in part on the reporting information, wherein the reputation score identifies the trustworthiness of the swarm of client devices; and
providing, by the server, the reputation score assigned to the swarm of client devices to at least one additional computing device participating in the torrent transaction that involves the swarm of client devices to enable the additional computing device to block network traffic associated with the torrent transaction based at least in part on the reputation score, wherein:
the reputation score enables the additional computing device to determine whether the torrent transaction represents a potential security risk; and
the torrent transaction facilitates obtaining the target file via a peer-to-peer file-sharing protocol.

14. The method of claim 13, wherein assigning the reputation score to the computing device comprises using the reporting information received from the swarm of client devices to update prior reputation scores that were previously assigned to the swarm of client devices.

15. The method of claim 14, further comprising providing the updated reputation scores to the additional computing device during the torrent transaction that involves the swarm of client devices.

16. The method of claim 13, wherein the swarm of client devices involved in the torrent transaction comprises at least one of:
an original seeder that uploaded the target file to a torrent hosting site;
a client device that provided at least a portion of the target file; and
a client device that downloaded at least a portion of the target file.

17. A system for using reputation information to evaluate the trustworthiness of files obtained via torrent transactions, the system comprising:
an identification module, stored in memory, that:
identifies a torrent file that comprises metadata for facilitating a torrent transaction for obtaining a target file via a peer-to-peer file-sharing protocol; and
identifies a swarm of client devices involved in the torrent transaction by seeding or downloading at least a portion of the target file;
a reputation module, stored in memory, that obtains reputation information for the swarm of client devices involved in the torrent transaction, wherein the reputation information:
identifies a state of security of each client device in the swarm;
identifies an overall health of each client device in the swarm; and
identifies an impact of the target file on the swarm of client devices;
wherein the identification module further:
identifies, based at least in part on the reputation information, a percentage of the client devices in the swarm whose overall health fails to reach a particular threshold; and
identifies, based at least in part on the reputation information, a percentage of the client devices in the swarm whose state of security fails to reach a certain threshold;
a security module, stored in memory, that:
determines, based at least in part on the reputation information for the swarm of client devices involved in the torrent transaction, that the target file represents a potential security risk based at least in part on:
the percentage of the swarm of client devices whose state of security fails to reach the certain threshold;
the percentage of the swarm of client devices whose overall health fails to reach the particular threshold; and
the impact of the target file on the swarm of client devices; and
performs a security action on the target file; and
at least one physical processor configured to execute the identification module, the reputation module, and the security module.

* * * * *